(12) United States Patent
Kurokawa et al.

(10) Patent No.: US 7,570,548 B2
(45) Date of Patent: Aug. 4, 2009

(54) OPTICAL PICKUP UTILIZING NONVOLATILE MEMORY AND ADJUSTMENT METHOD

(75) Inventors: Takahiro Kurokawa, Fujisawa (JP); Hiromi Kudo, Chigasaki (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 558 days.

(21) Appl. No.: 11/327,500

(22) Filed: Jan. 9, 2006

(65) Prior Publication Data

US 2007/0058501 A1 Mar. 15, 2007

(30) Foreign Application Priority Data

Sep. 15, 2005 (JP) ............................. 2005-268785

(51) Int. Cl.
*G11B 7/00* (2006.01)
(52) U.S. Cl. ................... 369/44.23; 369/53.34
(58) Field of Classification Search ........................ None
See application file for complete search history.

(56) References Cited

U.S. PATENT DOCUMENTS

| | | | | |
|---|---|---|---|---|
| 5,627,807 | A * | 5/1997 | Abe | 369/44.29 |
| 5,848,036 | A * | 12/1998 | Ishibashi et al. | 369/44.29 |
| 6,278,670 | B1 * | 8/2001 | Hayashi et al. | 369/44.41 |
| 7,164,638 | B2 * | 1/2007 | Wada et al. | 369/53.19 |
| 2001/0028614 | A1 | 10/2001 | Furukawa | |
| 2002/0176331 | A1 * | 11/2002 | Ariyoshi et al. | 369/44.23 |
| 2003/0099168 | A1 | 5/2003 | Ma et al. | |
| 2003/0107961 | A1 | 6/2003 | Yasuda et al. | |
| 2003/0147332 | A1 | 8/2003 | Ichimura et al. | |
| 2004/0017743 | A1 * | 1/2004 | Sasaki et al. | 369/44.32 |
| 2005/0063264 | A1 | 3/2005 | Miyamoto et al. | |

FOREIGN PATENT DOCUMENTS

| | | |
|---|---|---|
| EP | 1575039 | 9/2005 |
| JP | 61-280041 | * 12/1986 |
| JP | 63-013127 | * 1/1988 |
| JP | 2000-011388 | 1/2000 |
| JP | 2001-222838 | 8/2001 |
| JP | 2003-168225 | 6/2003 |
| JP | 2003-233917 | 8/2003 |
| JP | 2004-095106 | * 3/2004 |
| JP | 2004-171630 | 6/2004 |
| JP | 2004-241081 | 8/2004 |
| JP | 2004-241102 | 8/2004 |

* cited by examiner

*Primary Examiner*—Peter Vincent Agustin
(74) *Attorney, Agent, or Firm*—Antonelli, Terry, Stout & Kraus, LLP.

(57) ABSTRACT

This optical pickup has a nonvolatile memory from which data can be electronically read out, and stores as data the difference between the spherical aberration when the readout signal jitter reaches a minimum, and the spherical aberration when the tracking error signal amplitude reaches a maximum. The positioning of an optical detector or detection lens is adjusted so that the focus error signal is almost zero when the readout signal jitter reaches a minimum. The invention provides a method for performing high-precision adjustment of the focus offset and spherical aberration, even in the case of a disk which does not have data recorded on it.

3 Claims, 8 Drawing Sheets

FIG. 1 A NO ASTIGMATISM

FIG. 1 B ASTIGMATISM: 0.294λ, 0°

FIG. 1 C ASTIGMATISM: 0.294λ, 45°

FIG. 1 D ASTIGMATISM: 0.294λ, 90°

FIG. 1 E ASTIGMATISM: 0.294λ, 135°

FIG. 2 A  NO ASTIGMATISM

FIG. 2 B  ASTIGMATISM: 0.294λ, 0°

FIG. 2 C  ASTIGMATISM: 0.294λ, 45°

FIG. 2 D  ASTIGMATISM: 0.294λ, 90°

FIG. 2 E  ASTIGMATISM: 0.294λ, 135°

FIG. 3 A   NO ASTIGMATISM

FIG. 3 B   ASTIGMATISM: 0.294λ, 0°

FIG. 3 C   ASTIGMATISM: 0.294λ, 45°

FIG. 3 D   ASTIGMATISM: 0.294λ, 90°

FIG. 3 E   ASTIGMATISM: 0.294λ, 135°

OPTICAL PICKUP UTILIZING NONVOLATILE MEMORY AND ADJUSTMENT METHOD

CLAIM OF PRIORITY

The present application claims priority from Japanese application JP 2005-268785 filed on Sep. 15, 2005, the content of which is hereby incorporated by reference into this application.

FIELD OF THE INVENTION

The present invention relates to an optical pickup and adjustment method thereof in an information recording and reproduction system that performs recording or reproduction of information by light irradiation, which makes it possible to appropriately adjust the focus offset and spherical aberration to enable information to be recorded or reproduced without error.

BACKGROUND OF THE INVENTION

Optical disks commonly known as CDs, DVDs and the like have become widespread and are popular with consumers as high-capacity, low-price information recording media capable of random access. Recently, accompanying the increasing sophistication of personal computers and audio-visual devices, the amount of information handled by users has increased dramatically, and optical disks, as high-capacity information recording media, need to increase their capacity even more in response.

Recording onto an optical disk is performed by focusing laser beam with an objective lens to form optical spots on the recording medium, and forming recording marks on the information recording surface according to the optical spots. Further, information is reproduced by detecting, with optical spots, the difference in reflectance between the recording marks and other parts.

In this way, since information is recorded and reproduced on an optical disk using optical spots, the recording density of information is restricted by the size of the optical spots. Consequently, by reducing the size of optical spots, the information recording density of optical disks can be improved, and the recording capacity per disk can be increased. The diameter of an optical spot formed on the information recording surface is known to be proportionate to $\lambda/NA$, where $\lambda$ is the laser beam wavelength and NA is the objective lens numerical aperture. Therefore, effective ways to improve the information recording density of an optical disk are to shorten the laser beam wavelength and increase the numerical aperture of the objective lens.

Recently a high density optical disk having a recording capacity of approximately 25 GB per information recording surface has been developed by applying technology for reducing optical spots, using a blue laser diode of wavelength $\lambda=405$ nm and an objective lens having numerical aperture NA=0.85, instead of the red laser diode of $\lambda=650$ nm and objective lens with NA=0.6 that had been used in DVDs (recording capacity=4.7 GB per information recording surface).

Adjustment of the distance between the information recording surface and the focal point on the optical disk is performed by altering the target position of the focus servo. By controlling the focal point position so that the focus error signal becomes zero, the focus servo constantly makes the focal point follow the recording surface. In order to adjust the distance between the recording surface and the focal point, an offset (focus offset) is added to the focus error signal. Accordingly, by altering the target position of the focus servo, the average distance between the recording surface and the focal point can be adjusted.

However, increasing the NA of the objective lens in order to increase recording density gives rise to the problem of optical spot distortion due to spherical aberration. Since the spherical aberration is approximately proportional to $NA^4 \times d$, where d is the disk cover layer thickness error, in an optical disk system using a high NA objective lens, a large spherical aberration occurs by even a slight cover layer thickness error, causing readout signal quality to deteriorate markedly. Therefore, in the disk manufacturing process it was necessary to control the cover layer thickness with higher precision than in the case of conventional DVDs and the like, and this gave rise to issues of increasing manufacturing costs.

For the above-mentioned reasons, in the case of an optical disk system using a high NA objective lens, it is not sufficient simply to adjust the focus offset as in conventional DVDs, and a means to correct the spherical aberration in order to deal with cover layer thickness error for each disk is also essential.

Technology for correcting spherical aberration is used whereby in the optical system of an optical pickup, a spherical aberration compensation means is provided in the laser beam path, and by adding a prescribed amount of spherical aberration to the light beams passing through, the spherical aberration generated by the disk cover layer thickness error when light is focused onto the recording surface by an objective lens, and the spherical aberration added in advance by the spherical aberration compensation means cancel each other out. As a spherical aberration compensation means used in this way, (1) a spherical aberration compensation means that comprises a 2-group objective lens, which alters the distance between each objective lens using an actuator, and (2) a spherical aberration compensation means that comprises liquid crystal elements split into a plurality of regions, which controls the refractive index of each region by applying a voltage, and other such means are known, and are described in Patent document 1 and 2 for example.

There are various commonly known examples of indices for determining the spherical aberration to be applied in advance by the spherical aberration compensation means (hereinafter simply referred to as "spherical aberration"). For example, using the technology described in Patent document 1, adjustment of the focus offset and spherical aberration is performed according to the variation of the readout signal (RF signal) amplitude obtained when reproducing data recorded on the disk. However, with respect to a disk that does not have any data recorded (no recording marks), in other words a blank disk, even if one tried to optimize the focus offset and spherical aberration, since a readout signal cannot be obtained, this could not be performed.

Further, since the technology described in Patent document 2 also performs adjustment of the focus offset and spherical aberration using the data readout signal amplitude or both the data readout signal amplitude and the tracking error signal amplitude, there must be some data recorded on the information recording surface of the optical disk. In other words, this was still problematic in that if the optical disk did not have any data recorded on it, the necessary readout signal could not be obtained, and adjustment of the spherical aberration could not be achieved.

As technology to resolve this problem, technology for performing adjustments of the focus offset and spherical aberration based on the tracking error signal or wobble signal, which can be obtained even from a blank disk, is known, and described in the following patent documents for example.

[Patent document 1] JP-A No.11388/2000
[Patent document 2] JP-A No.222838/2001
[Patent document 3] JP-A No.233917/2003
[Patent document 4] JP-A No.168225/2003
[Patent document 5] JP-A No.171630/2004
[Patent document 6] JP-A No.241081/2004
[Patent document 7] JP-A No.241102/2004

SUMMARY OF THE INVENTION

FIGS. 1A to 1E show the contour lines of the tracking error signal amplitude, calculated using an optical diffraction simulator when the focus offset and spherical aberration were altered. Here, the tracking error signal refers to the push-pull signal. The tracking error signal amplitude is normalized by its maximum value, and the contour lines show intervals of 1%, with the outermost circumference showing 80%.

The size of the focus offset is normalized by the focus error signal amplitude (0-p). Further, for convenience, the size of the spherical aberration is shown converted into the disk cover layer thickness error (unit: μm). Hereinafter, the size of the focus error and spherical aberration shall be expressed in these terms.

As calculation conditions, we divided cases into those without astigmatism in the optical system (FIG. 1A), and those with 0.294λ (0.06 λrms) astigmatism. Further, regarding cases with astigmatism, we divided them into 4 types according to the direction of astigmatism: 0°, 45°, 90°, and 135° (FIGS. 1B to 1E). We defined the direction of astigmatism with 0° as the recording track direction that an optical spot extends toward when the objective lens has moved to the side close to the disk (in focus). Table 1 shows the parameters used in calculations.

TABLE 1

Parameters used in calculations

| | |
|---|---|
| Laser wavelength | 405 nm |
| Objective lens NA | 0.85 |
| Disk cover layer refractive index | 1.56 |
| Disk cover layer thickness | 100 μm |
| Track pitch | 0.32 μm |
| Track groove width | 1.16 μm |
| Track groove depth | 40.5 nm |

FIGS. 2A to 2E show the contour lines plotted after calculating the readout signal jitter when the focus offset and spherical aberration were altered, using an optical simulator and a signal processing simulator. The parameters used in the optical calculations were the same as Table 1. Jitter was defined as the standard deviation of the phase difference between the binary readout signal and the channel clock signal generated using this, normalized by the channel clock period. For the readout signal processing before calculating jitter, we performed waveform equalization with a limit equalizer. A detailed description of a limit equalizer can be found for example in S. Miyanabe et al.: Jpn. J.Appl.Phys. Vol. 38 pp. 1715.

FIGS. 3A to 3E show the contour lines of the tracking error signal amplitude in FIGS. 1A to 1E superimposed on the contour lines of the jitter in FIGS. 2A to 2E. FIGS. 3A to 3E also show the points at which the center intensity of the optical spot is at a maximum. As can be seen from FIGS. 3A to 3E, the maximum points of tracking error signal amplitude do not always coincide with the minimum points of jitter or the maximum points of the center intensity of the optical spot. Therefore, when the focus offset and spherical aberration are adjusted so that the tracking error signal amplitude reaches a maximum, it may deviate from the minimum point of jitter or the maximum point of the center intensity of the optical spot, meaning that good quality recording and reproduction cannot be performed.

Further, the rate of change of the tracking error signal amplitude with respect to alterations of the focus offset and spherical aberration has a tendency to be extremely small, and this decreases adjustment precision. In particular, if focus offset is adjusted when spherical aberration is not at an appropriate value, focus offset may deviate significantly from the appropriate value.

It is thought that since it is cover layer thickness that varies greatly from disk to disk, the only thing that must be altered for each disk is the spherical aberration, and focus offset need not be altered greatly. Notwithstanding this, by adjusting the focus offset and spherical aberration two-dimensionally, in the case of a large adjustment error, the problem arose that the focus offset would be made to deviate greatly from the appropriate value unnecessarily.

Therefore, when adjusting the focus offset and spherical aberration, it is desirable to first set an appropriate focus offset and then adjust the spherical aberration while maintaining that focus offset.

In view of the aforementioned problems, it is an object of the present invention to provide a means for designating an appropriate initial focus offset value, in order to make precise adjustments to the focus offset and spherical aberration in a high-density optical disk that uses a high NA objective lens.

The composition of the optical pickup and adjustment method thereof according to the present invention is described below.

Composition of optical pickup: The optical pickup according to the present invention comprises a nonvolatile memory from which data can be electronically read out. The nonvolatile memory is used to store data relating to the pickup properties. The nonvolatile memory is able to retain data stored therein, even if the power supply is cut off. Further, read/write operations can be performed electronically with respect to this nonvolatile memory. Therefore, the data that was obtained and stored in the nonvolatile memory when the optical pickup was being manufactured can be read out from the disk drive after the optical pickup is installed into the disk drive.

The data stored in the nonvolatile memory is, for example, the difference between the spherical aberration when the readout signal jitter reaches a minimum and the spherical aberration when the tracking error signal reaches a maximum, while keeping the focus offset the same as when the readout signal jitter reaches a minimum. Thus, with respect to a blank disk, by first adjusting the spherical aberration so that the tracking error signal amplitude reaches a maximum, and then altering the spherical aberration just by the above-mentioned difference, it is possible to adjust the spherical aberration so that the readout signal jitter reaches a minimum, without looking at the readout signal.

In addition, under conditions of minimum readout signal jitter, since the center intensity of the optical spot is large, the effective recording power increases. Due to this, by performing this step before recording, it is possible to improve the recording quality.

In this way, even with respect to disks that have no data recorded, high-precision aberration compensation is possible. Further, by simplifying compensation processing, processing time can be reduced.

In order to make even more precise adjustments, after performing rough adjustments according to the tracking error signal amplitude, it is also possible to perform recording, and using the readout signal jitter obtained from the recording marks as the evaluative index, fine tune the spherical aberration. In this case, since the spherical aberration when the readout signal jitter reaches a minimum and the spherical aberration when the effective recording power reaches a maximum are close, good recording quality can be obtained when recording in order to fine tune.

Optical pickup adjustment method: In the optical pickup adjustment method according to the present invention, the optical system is adjusted so that the focus error signal becomes almost zero when the readout signal jitter reaches a minimum. The method to adjust the optical system involves adjusting the position of an optical detector or detection lens for example. This step is performed during the manufacturing of the optical pickup. By adjusting the pickup so that the focus error signal reaches a certain value in conditions of good readout signal quality, after the pickup is built into the disk drive, when searching for the appropriate focus offset, the scope of the search can be hugely reduced. Accordingly, this can contribute to decreasing the compensation processing time in the disk drive.

Then, when performing aberration compensation in the disk drive, the spherical aberration amounts are scanned with the focus offset set at zero. Accordingly, aberration compensation processing, which would normally be performed by two-dimensionally altering the focus offset and the spherical aberration, can be consolidated, involving just the one dimension of the spherical aberration. Therefore, this can prevent significant and unnecessary deviation of the focus offset from the optimal value due to adjustment error.

Regarding the focus offset, since the readout signal jitter is fixed at a condition almost at the minimum, there is no danger of the focus offset significantly deviating from the appropriate amount as in the case of two-dimensional adjustment of the focus offset and spherical aberration. Further, the time taken to fix the focus offset can be reduced compared to two-dimensional adjustment.

According to the present invention, since the optimal focus offset and spherical aberration can be determined even for a blank disk, in other words a disk that does not have recording marks meaning that the focus offset and spherical aberration adjustment cannot be performed based on the readout signal, the reliability of information recording and reproduction can be improved.

DETAILED DESCRIPTION OF THE PREFERRED EMBODIMENTS

Embodiments of the present invention are explained below with reference to the drawings.

Figure 9:
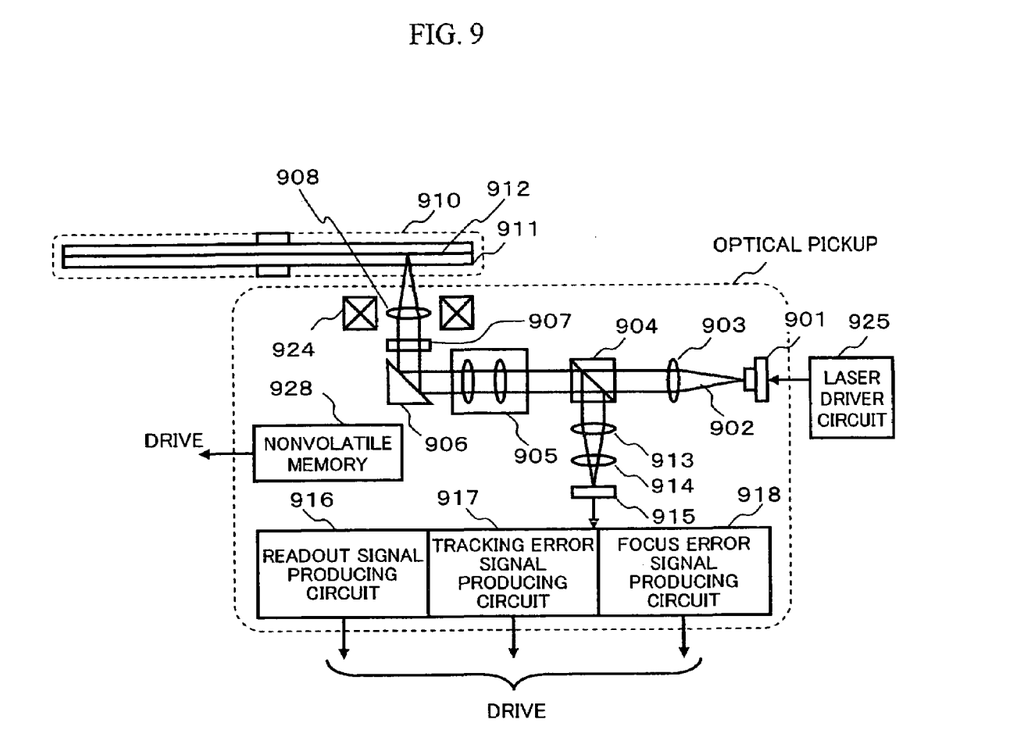
FIG. 9 is a figure showing the composition of the optical pickup according to an embodiment of the present invention.

FIG. 9 shows in frame format the composition of the optical pickup according to the present invention.

Linearly polarized laser beam 902 emits from a laser diode 901, and is converted into a parallel beam by a collimator lens 903. Next, the laser beam 902 passes through a polarization beam splitter 904. The polarization beam splitter 904 is arranged so as to transmit the laser beam 902 being emitted by the laser diode 901 with almost no loss. The laser beam 902 that has passed through the polarization beam splitter 904 has a prescribed spherical aberration added thereto by a spherical aberration compensation element 905, and is reflected on a reflection mirror 906, changing its path to the direction of an optical disk medium 910 that is being rotated. Next, by passing through a quarter-wave plate 907, the polarization state of the laser beam 902 changes from linearly polarized light to circularly polarized light. After this, the laser beam 902 is focused by an objective lens 908, passes through a cover layer 911 protecting the information recording surface, and reaches the information recording surface 912, forming an optical spot thereon.

Information is recorded by focusing the laser beam, which has been modulated according to the data, and irradiating the information recording surface, changing the state of the information recording surface by heat generated by the optical spots thus formed. Further, reproduction of information is performed by detecting the change in reflectivity brought about by the change in the state of the information recording surface. In the case of a read only optical disk, information is reproduced by detecting the change in reflectivity of the light caused by uneven pits, which are formed in advance on the information recording surface during the disk manufacturing process.

Figure 10:
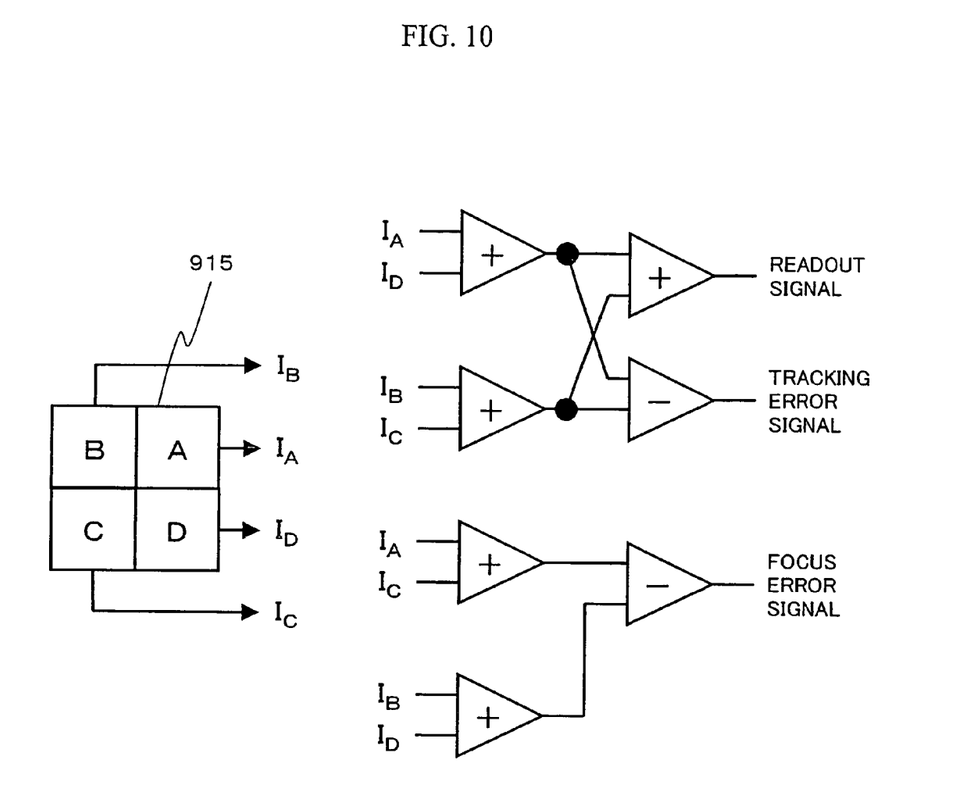
FIG. 10 is a figure showing the composition of an optical detector and a method for producing a readout signal, tracking error signal and focus error signal.

The laser beam 902 reflected on the information recording surface passes through the objective lens 908, then, passing through the quarter-wave plate 907 it again reverts to linearly polarized light, further reflects on the start-up mirror 906, and heads in the direction of the polarization beam splitter 904. The laser beam 902 then reflects on the polarization beam splitter 904 and changes its path to the perpendicular direction. Next, the laser beam 902 is focused into an optical detector 915 by a detection lens 913 and a cylindrical lens 914 for detecting the focus error signal. As shown in FIG. 10, the optical detector 915 is split twice along the radial direction and twice along the track direction, forming a total of four sections. Each of the divided detectors A, B, C and D output an output signal $I_A$, $I_B$, $I_C$, and $I_D$. Using these output signals, a readout signal, tracking error signal, and focus error signal are generated by a readout signal producing circuit 916, a tracking signal error producing circuit 917, and a focus error signal producing circuit 918, shown in FIG. 9, according to the following formulae.

(Readout signal)=$(I_A+I_B+I_C+I_D)$ (Tracking error signal)=$(I_A+I_D)-(I_C+I_B)$ (Focus error signal)=$(I_A+I_C)-(I_B+I_D)$ The readout signal is a data signal, and is processed in the disk drive, reproducing the data. The tracking error signal is also known as a push-pull signal, and is a signal that is generated due to the displacement of an optical spot with respect to the track, in the radial direction of the disk. It is used in the tracking servo to make the optical spot follow the track. Here, the tracking servo is performed by the push-pull method. Based on the tracking signal error, the objective lens 908 is driven along the radial direction of the disk, and positioning of the optical spot is performed.

The focus error signal is a signal that is generated due to the displacement of an optical spot with respect to the information recording surface 912 in the rotational direction of the disk, and is used in the focus servo to make the optical spot follow the information recording surface 912. Here, the focus servo is performed by the astigmatism method. Based on the focus signal error, the objective lens 908 is driven along the rotational direction of the disk, and positioning of the optical spot is performed.

During data recording, a laser diode 925 is driven based on the recording signal generated in the disk drive.

Data concerning the difference between the spherical aberration when the readout signal jitter reaches a minimum, and the spherical aberration when the tracking error signal reaches a maximum is stored in a nonvolatile memory 928. This data is measured and stored during manufacturing of the optical pickup.

Figure 1A:
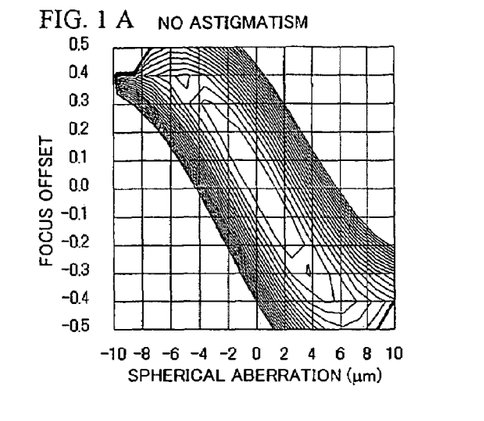
FIGS. 1A to 1E are figures showing the relationship between the focus offset and spherical aberration, and the tracking error signal amplitude (calculations)
Figure 1B:
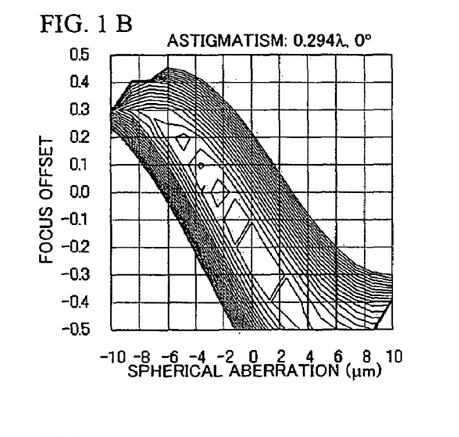
Figure 1C:
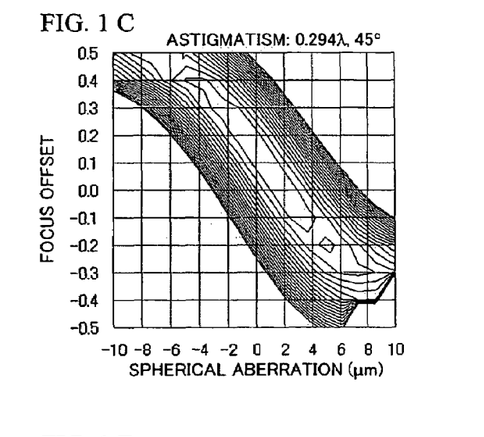
Figure 1D:
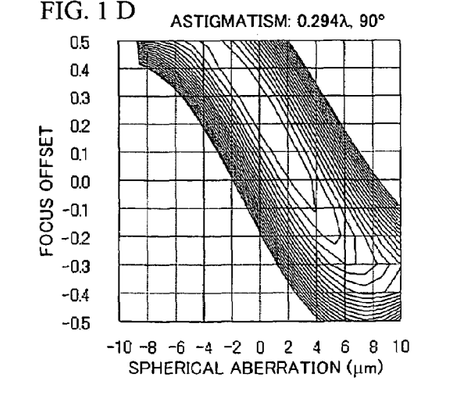
Figure 1E:
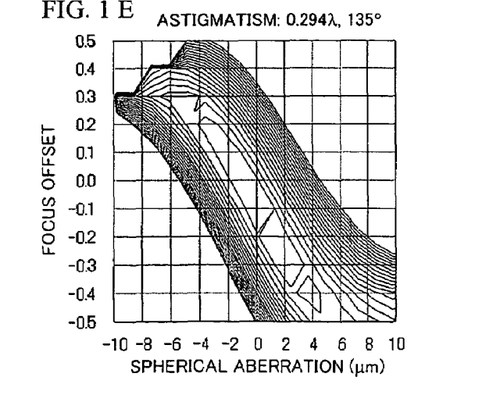
Figure 2A:
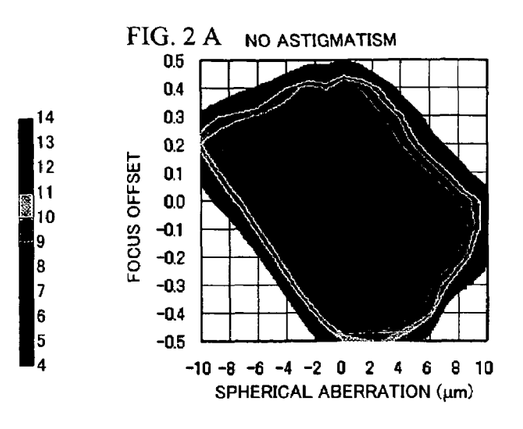
FIGS. 2A to 2E are figures showing the relationship between the focus offset and spherical aberration, and the jitter (calculations)
Figure 2B:
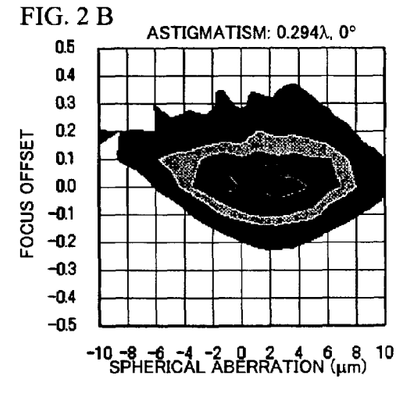
Figure 2C:
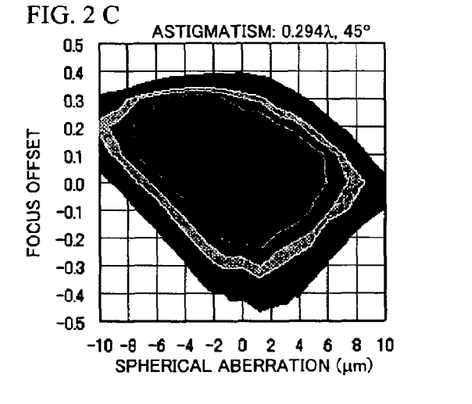
Figure 2D:
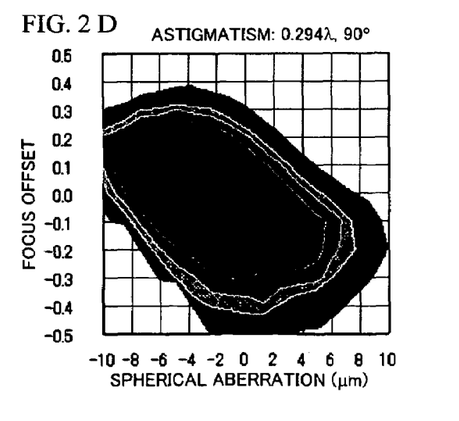
Figure 2E:
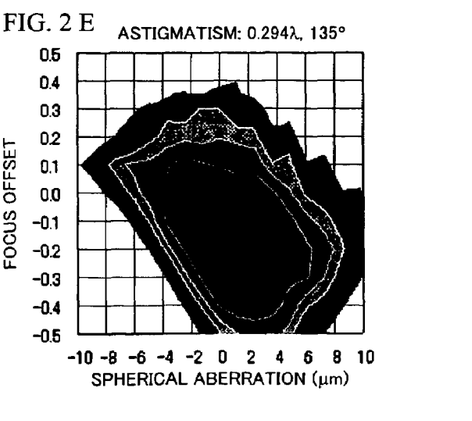
Figure 3A:
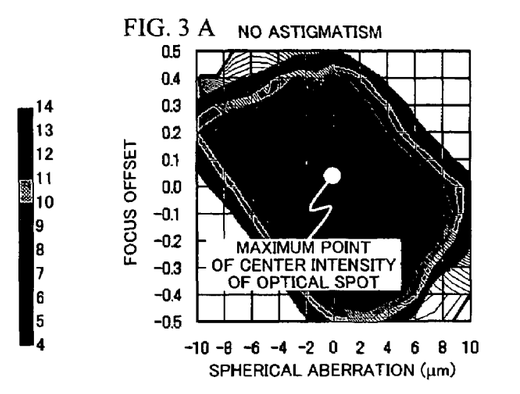
FIGS. 3A to 3E are figures showing the relationship between the focus offset and spherical aberration, and the tracking error signal amplitude and jitter (calculations)
Figure 3B:
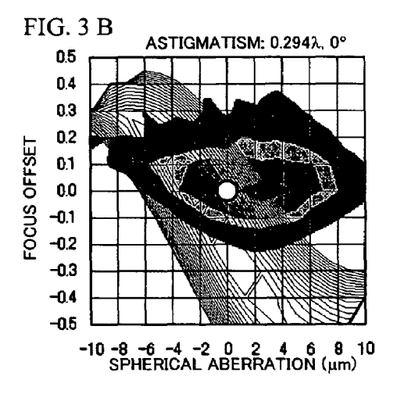
Figure 3C:
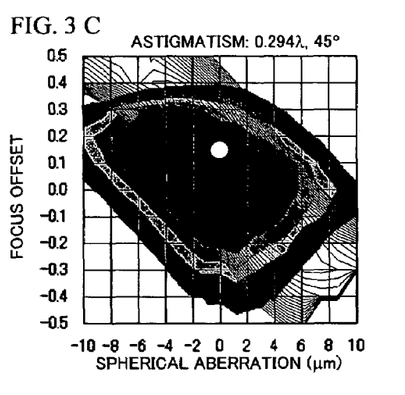
Figure 3D:
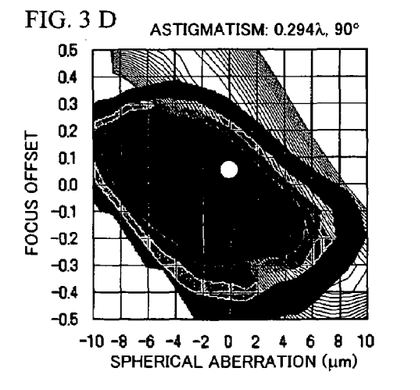
Figure 3E:
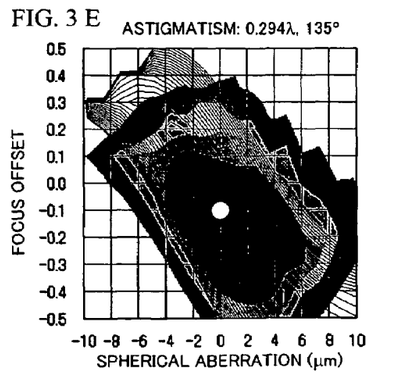
Figure 4:
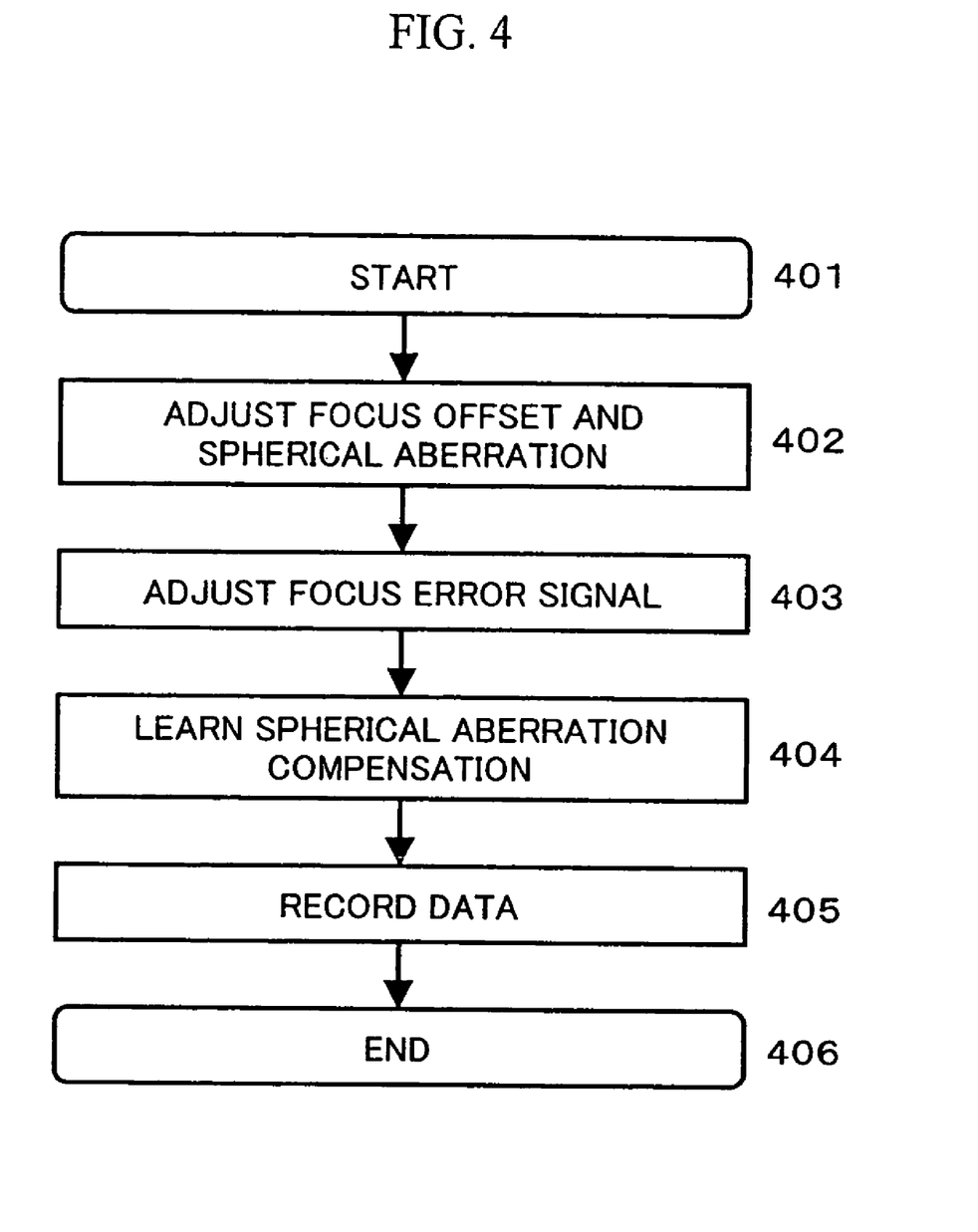
FIG. 4 is a figure showing an optical pickup adjustment procedure according to the present invention.

The optical pickup adjustment method according to the present invention shall be explained using the flowchart in FIG. 4.

(1) Step 401:
Adjustment is begun.

(2) Step 402:
With respect to the disk for adjustment that contains pre-recorded data, the focus offset and spherical aberration are two-dimensionally adjusted so that the readout signal jitter reaches a minimum.

(3) Step 403:
The position of the optical detector or detection lens is adjusted so that the focus error signal reaches zero when the readout signal jitter reaches a minimum.

(4) Step 404:
The spherical aberration amounts are scanned and the spherical aberration corresponding to the maximum tracking error signal amplitude is searched for.

(5) Step 405:
The value of the difference between the spherical aberration corresponding to the minimum readout signal jitter and the spherical aberration corresponding to the maximum tracking error signal amplitude is stored in the nonvolatile memory 928 shown in FIG. 9.

(6) Step 406:
Adjustment is completed.
Thus, the optical pickup according to the present invention is adjusted in advance so that the focus error signal becomes zero when the readout signal jitter reaches a minimum. When this optical pickup is built into a disk drive, the disk drive reads out the data stored in the nonvolatile memory 928 of the optical pickup, in other words the data concerning the difference between the spherical aberration when the readout signal jitter reaches a minimum, and the spherical aberration when the tracking error signal reaches a maximum. When performing aberration compensation with respect to a blank disk, the disk drive scans the spherical aberration amounts with the focus offset set at zero. Then, the spherical aberration is adjusted so that the tracking error signal amplitude reaches a maximum, and thereafter the spherical aberration is altered only by the difference read from the nonvolatile memory. These operations enable the spherical aberration to be adjusted so that the readout signal jitter reaches a minimum, without looking at the readout signal.

According to the above-mentioned embodiment, tracking servo is performed using the push-pull method, but other methods may also be used. For example, tracking servo may be performed using the differential push-pull method. In that case, a diffraction grating for splitting laser light beams into three: a main beam and two sub-beams, is provided in the light path, and an optical detector exclusively for sub-beams is newly provided, enabling a push-pull signal to be obtained with respect to the sub-beams. Further, tracking servo may also be performed using the differential phase detection method with respect to a read only optical disk or the like.

According to the above-mentioned embodiment, focus servo is performed using the astigmatism method, but other methods may also be used. For example, focus servo may be performed using the knife edge method or the spot size detection method. In such a case, it is necessary to newly provide an optical detector for obtaining the focus error signal.

In the above-mentioned embodiment, there is a step of adjusting either the focus offset or the spherical aberration so that the readout signal jitter reaches a minimum, but it is possible to adjust either the focus offset or the spherical aberration so that the readout signal amplitude reaches a maximum instead.

Next the results of an experiment conducted to verify the effects of the optical pickup and adjustment method thereof according to the present invention will be shown. In this experiment, we adjusted the pickup following the steps of the adjustment method according to the present invention. Then we built the pickup into a disk drive, and trialed aberration compensation processing. The following describes the procedure and results.

The focus offset is shown below in a form normalized by a 0-p value of an S-curve signal. The spherical aberration is shown in a form with the aberration converted into the disk cover layer thickness displacement (unit: μm). These values are relative values with the initial value as the point of origin.

First, we performed pickup adjustment.

(0) Step 00:
We began pickup adjustment.

(1) Step 01:
With respect to the disk for adjustment containing prerecorded data, we two-dimensionally adjusted the focus offset and spherical aberration so that the readout signal jitter reached a minimum.

(2) Step 02:
We adjusted the position of the optical detector or detection lens so that the focus error signal reached zero when the readout signal jitter reached a minimum.

(3) Step 03:

We scanned the spherical aberration amounts and searched for the spherical aberration corresponding to the maximum tracking error signal amplitude.

(4) Step 04:

We determined the value of the difference between the spherical aberration corresponding to the minimum readout signal jitter and the spherical aberration corresponding to the maximum tracking error signal amplitude ($\Delta SA$) to be $\Delta SA=-1.0\,\mu m$. This value $\Delta SA$ ($=-1.0\,\mu m$) was stored in the nonvolatile memory 928 provided in the pickup (FIG. 9).

(5) Step 05:

We completed adjustment.

Next, we built the adjusted pickup into the disk drive. The following are the steps we performed for aberration compensation during operation of the disk drive.

(6) Step 06: Start

We began adjustment.

(7) Step 07: Initial settings

We set the focus offset as FE0 ($=0.0$). Then, we read out the $\Delta SA$ value from the nonvolatile memory 928 contained in the pickup ($\Delta SA=-1.0\,\mu m$).

(8) Step 08: Spherical aberration compensation (rough adjustment)

Figure 5:
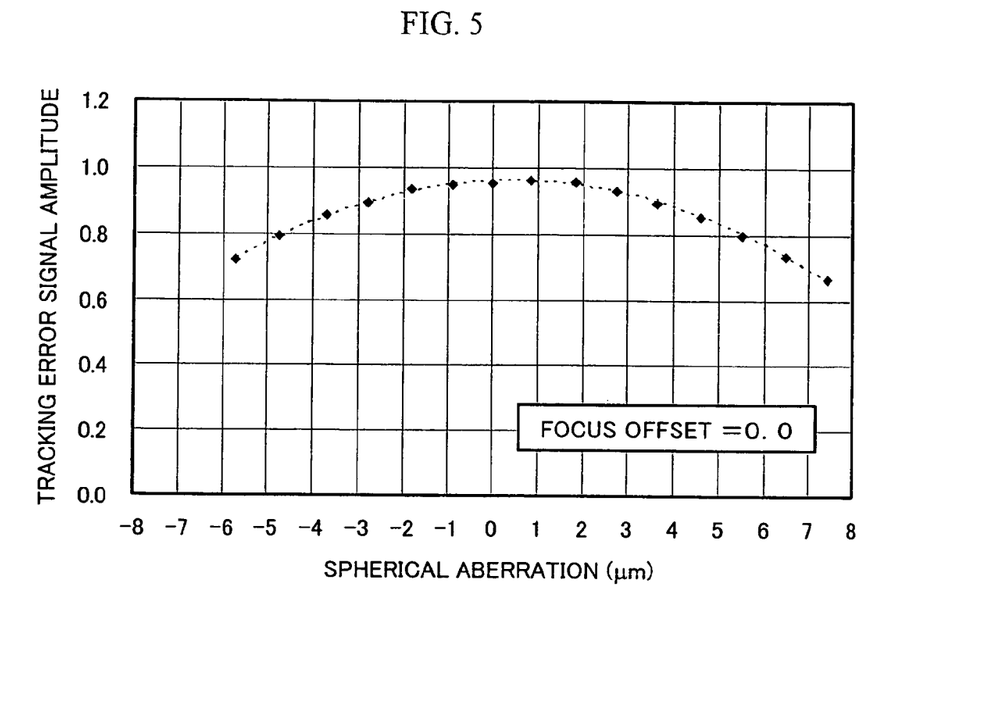
FIG. 5 is a figure showing the relationship between the spherical aberration and the tracking error signal (experiment)

We measured the tracking error signal amplitude while altering the spherical aberration, maintaining the focus offset. The results are shown on the graph in FIG. 5. According to these measurement results, we selected and set $+0.85\,\mu m$ as the spherical aberration corresponding to the maximum tracking error signal amplitude.

(9) Step 09: Spherical aberration shift

We altered the spherical aberration by $\Delta SA$ ($=-1.0\,\mu m$).

(10) Step 10: Recorded/unrecorded distinction

We distinguished whether data had been recorded onto the disk or not.(11)

Step 11: Adjustment of recording power

We performed recording while altering the recording power in the region for recording power adjustment on the disk; we measured the degree of modulation of the readout signal, and selected and set the recording power giving the desired modulation.

(12) Step 12: Recording

We recorded the data onto the disk. In this step, we recorded data with respect to 5 successive recording tracks.

(13) Step 13: Second time spherical aberration compensation (fine tuning)

Figure 6:
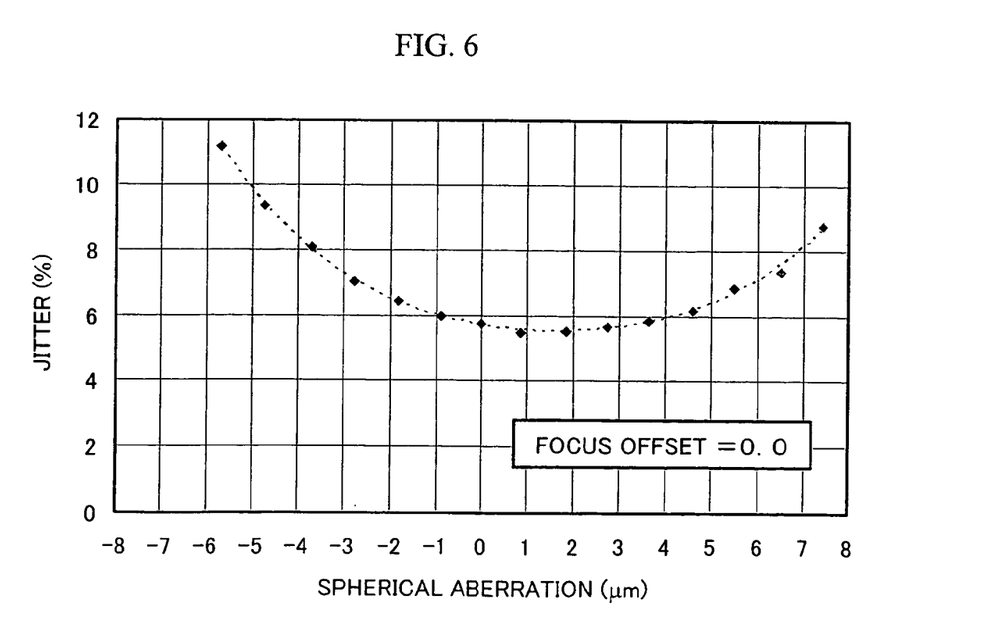
FIG. 6 is a figure showing the relationship between the spherical aberration and the jitter (experiment)

Of the five successive recording tracks that we recorded in step 12, we moved to the central recording track and measured the jitter while altering the spherical aberration. The results are shown on the graph in FIG. 6. According to these measurement results, we selected and set $+0.85\,\mu m$ as the spherical aberration corresponding to the minimum jitter.

(14) Step 14: Focus fine tuning

Figure 7:
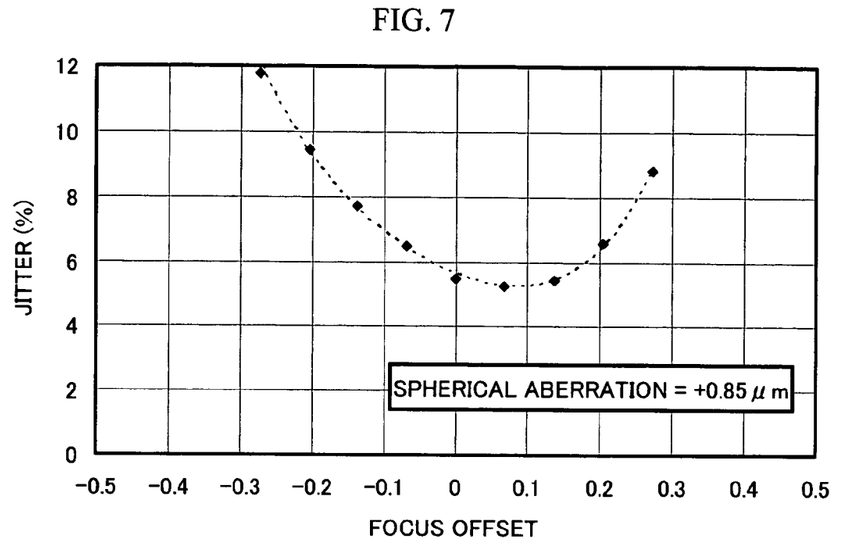
FIG. 7 is a figure showing the relationship between the focus offset and the jitter (experiment)

In the same recording track as in step 7, we measured the jitter while altering the focus offset. The results are shown on the graph in FIG. 7. According to these measurement results, we selected and set $+0.068$ as the focus offset corresponding to the minimum jitter.

(15) Step 15: Completion

We finished adjustment.

Following the above procedure, we eventually adjusted values to focus offset=$+0.068$, spherical aberration=$+0.85\,\mu m$. The readout signal jitter at this time was 5.3%.

Figure 8:
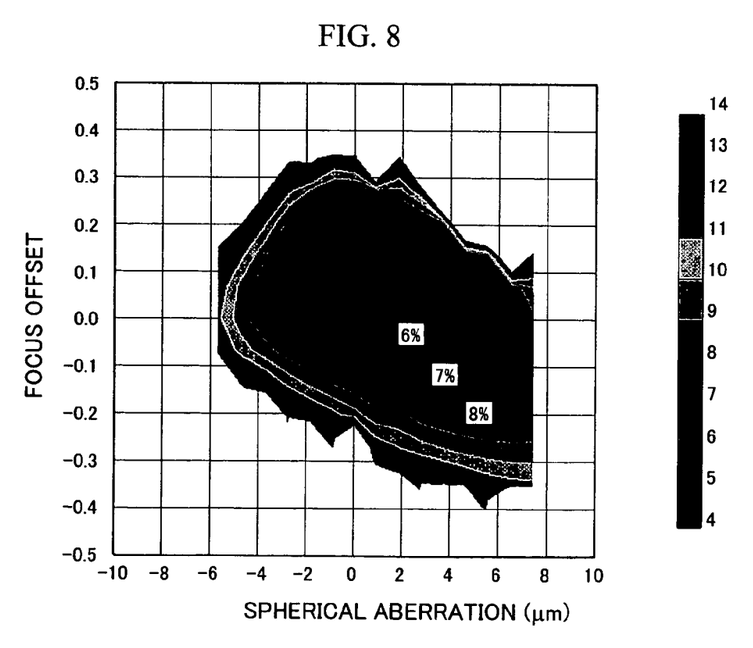
FIG. 8 is a figure showing the relationship between the focus offset and spherical aberration, and the jitter (experiment)

Next the precision of the aberration compensation procedure according to the present invention will be verified. FIG. 8 shows the contour lines plotted after measuring the readout signal jitter when the focus offset and spherical aberration were altered two-dimensionally in detail. According to these measurement results, the readout signal jitter reached a minimum when the focus offset was $+0.068$ and the spherical aberration was $+1.85\,\mu m$, and the jitter at this time was 5.2%.

Thus, as a result of adjusting the focus offset and spherical aberration following the aberration compensation procedure according to the present invention, the difference from the conditions of minimum jitter was small: 0.0 in terms of focus offset and $-1.0\,\mu m$ spherical aberration, and the amount of increase from the minimum jitter was extremely small at only $+0.1\%$. As can be seen from the above, it was confirmed that following the aberration compensation procedure according to the present invention, focus offset and spherical aberration can be adjusted with high precision.

What is claimed is:

1. An optical pickup comprising:
    a laser light source;
    a spherical aberration compensation unit that adds a spherical aberration of a variable amount to a laser beam emitted from said laser light source;
    an objective lens that focuses the laser beam to which said spherical aberration has been added, onto an optical disk;
    an optical detector that receives the laser beam reflected on the optical disk;
    a signal processing unit that generates a readout signal, tracking error signal and focus error signal from the output of said optical detector;
    an actuator that drives said objective lens based on said focus error signal and said tracking error signal; and
    a nonvolatile memory from which data can be electronically read out;
    wherein the focus error signal is almost zero when the readout signal jitter reaches a minimum; and
    wherein data concerning a difference between the spherical aberration when the readout signal jitter reaches a minimum and the spherical aberration when the tracking error signal amplitude reaches a maximum is recorded in said nonvolatile memory.

2. An optical pickup comprising:
    a laser light source;
    a spherical aberration compensation unit that adds a spherical aberration of a variable amount to laser beam emitted from said laser light source;
    an objective lens that focuses the laser beam to which said spherical aberration has been added, onto an optical disk;
    an optical detector that receives the laser beam reflected on the optical disk;
    a signal processing unit that generates a readout signal, tracking error signal and focus error signal from the output of said optical detector; and
    an actuator that drives said objective lens based on said focus error signal and said tracking error signal, and
    a nonvolatile memory from which data can be electronically read out;
    wherein the focus error signal is almost zero when the readout signal jitter reaches a minimum; and
    wherein data concerning a difference between the spherical aberration when the readout signal amplitude reaches a maximum and the spherical aberration when the tracking error signal amplitude reaches a maximum is recorded in said nonvolatile memory.

3. A method of adjustment of an optical pickup including a laser light source, a spherical aberration compensation unit that adds a spherical aberration of a variable amount to a laser beam emitted from said laser light source, an objective lens that focuses the laser beam to which said spherical aberration has been added onto an optical disk, a detection lens that focuses the laser beam reflected on the optical disk, an optical detector that receives the laser beam focused by said detection lens, a signal processing unit that generates a readout signal, tracking error signal and focus error signal from the output of said optical detector, an actuator that operates said objective lens based on said focus error signal and said tracking error signal, and a nonvolatile memory, said method comprising the steps of:

adjusting the amount of offset of said focus error signal and the amount of said spherical aberration, so that said readout signal jitter reaches a minimum;

adjusting the position of said optical detector or said detection lens so that the size of said focus error signal becomes almost zero when said readout signal jitter reaches a minimum; and determining the amount of said spherical aberration when said readout signal jitter reaches a minimum and the amount of said spherical aberration when said tracking error signal amplitude reaches a maximum, while maintaining said offset amount, and storing this data in said nonvolatile memory.

* * * * *